Nov. 18, 1958    B. COTTER    2,860,911
AUTOMOBILE BODY PILLAR AND DOOR CONSTRUCTION
Filed Oct. 25, 1954    3 Sheets-Sheet 1

INVENTOR
Bart Cotter
BY
Paul Fitzpatrick
ATTORNEY

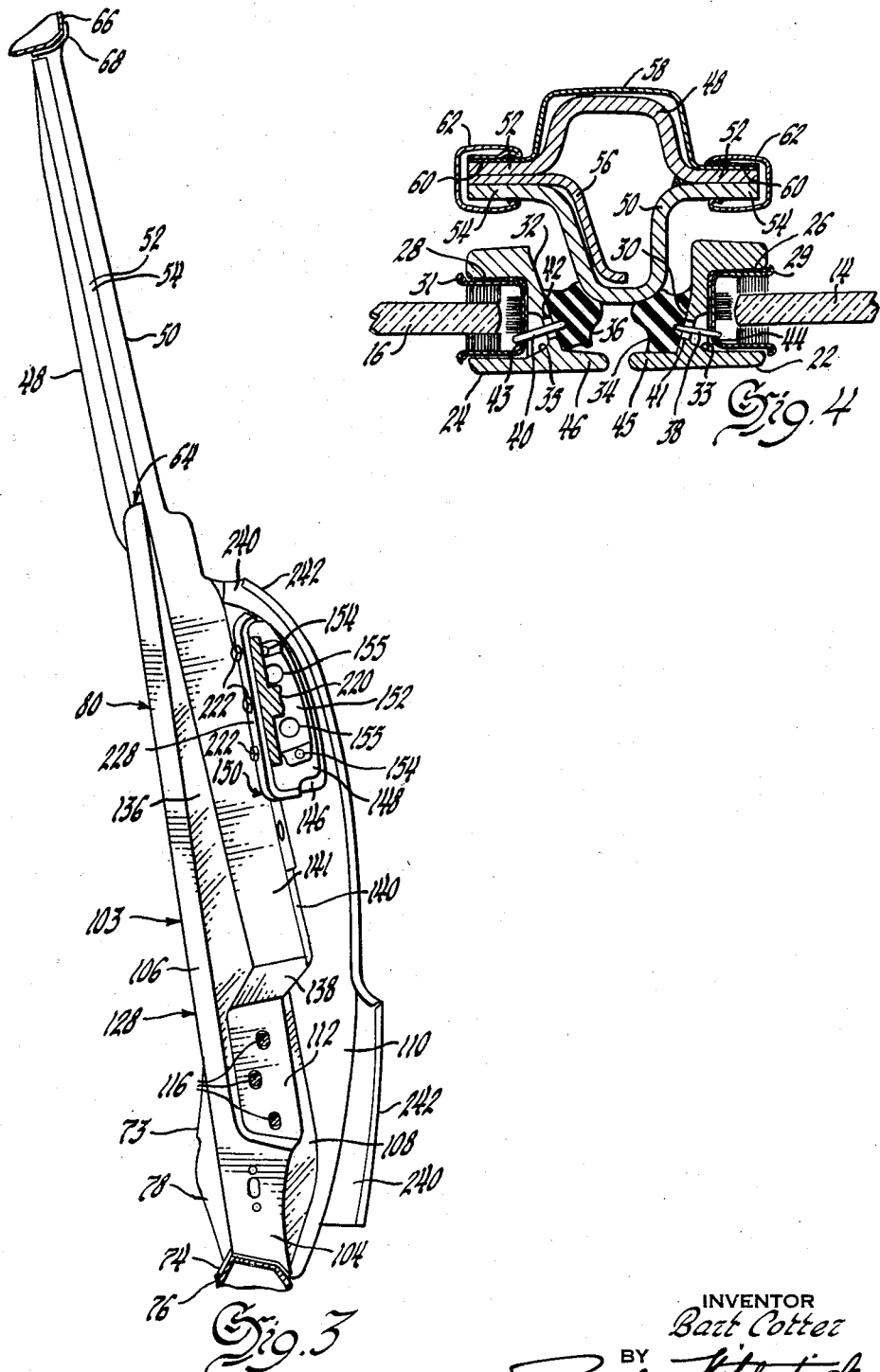

Nov. 18, 1958   B. COTTER   2,860,911
AUTOMOBILE BODY PILLAR AND DOOR CONSTRUCTION
Filed Oct. 25, 1954   3 Sheets-Sheet 3

INVENTOR
Bart Cotter
BY
Paul Fitzpatrick
ATTORNEY

United States Patent Office 2,860,911
Patented Nov. 18, 1958

2,860,911

AUTOMOBILE BODY PILLAR AND DOOR CONSTRUCTION

Bart Cotter, Detroit, Mich., assignor to General Motors Corporation, Detroit, Mich., a corporation of Delaware Application October 25, 1954, Serial No. 464,201

5 Claims. (Cl. 296—28)

This invention relates to automobile bodies, and more particularly to the door and pillar structure of automobile bodies.

In present automobile bodies of the four-door type, the front door is usually hinged at its forward edge to the body and the rear door is usually hinged at its forward edge to the door pillar forming the part of the body between the doors. Space is provided between the rear door and the pillar for the door hinges and to permit inward swinging of the forward edge of the rear door as the door is opened. The door window frames are usually thinner than the door, and wells are provided in the doors for the vertically moving front and rear door windows.

This invention reduces the blind space between the front and rear door windows to a minimum by reducing the cross section of the pillar above the body belt line and by forming the portions of the window frame abutting against the pillar of small channel members. This will result in a blind space of approximately 2½ inches as compared to a blind space of about 4½ inches in prior four-door automobiles. However, the pillar below the belt line must still have a cross section greater than its cross section above the belt line in order to support the rear door and support the front door in its closed position.

The forward portion of the rear window frame overhangs the door pillar below the belt line and the space between the rear door and the pillar. Thus, clearance must be provided between the vertically moving rear door window and the door pillar below the belt line, and the window must travel in the space between the rear door and the pillar without interfering with the rear door hinges.

This invention solves the problem of window travel caused by narrowing the blind space between the front and rear door windows. In the preferred embodiment of this invention, the rear side of the pillar facing the rear door is offset forwardly from the body belt line down to the lower portion of the pillar which is rectangular in cross section and below the window travel. The rear door is provided with an extension projecting forwardly of the body and positioned within the offset portion of the pillar in the closed position of the door. The extension provides a housing for the forward portion of the rear window as it moves vertically into and out of the usual door well. The forward edge of the rear door has a marginal flange which is spaced from the extension on the rear door. The upper door hinge fits between the marginal flange and the extension, one leaf of the hinge being secured to the door adjacent the extension thereof, and the other leaf of the hinge being secured to an angular bracket mounted on the pillar adjacent the offset therein. The angular bracket maintains the proper door swing.

The use of the angular bracket permits the lock striker to be mounted on the front side of the pillar opposite the angular bracket mounted on the rear side of the pillar. The front side of the pillar is offset rearwardly of the pillar opposite the angular bracket, and the base of the offset is very close to the rear side of the pillar. A lock striker is mounted in the offset, flush with the front side of the pillar. The striker and the leaves of the rear door hinge should be adjustable. Therefore, the angular bracket is rigidly secured to the rear side of the pillar, and the one hinge leaf is adjustably secured to the bracket, while the lock striker is adjustably secured to the pillar. If both the hinge leaf and the lock striker were secured to the pillar opposite each other, it would be exceedingly difficult to make both adjustable. The opposite sides of the pillar are close to each other at this point, and either the usual cage mechanism containing the threaded adjusting plate for adjusting the striker would take up the entire space between the sides of the pillar or the nuts for the bolts which usually secure the hinge leaf to the pillar would take up the entire space between the sides of the pillar.

The outboard side of the pillar is spaced inwardly of the marginal flange on the rear door and has a flange projecting outboard of the body. A guard is mounted on this flange to prevent injury to anyone having their fingers between the flange on the pillar and the marginal flange of the door as the rear door is closed from its open position. The guard also continues the body contour between the front and rear doors.

The primary object of this invention is to reduce the blind space between the front and rear windows of a four-door automobile to a minimum. Another object of this invention is to provide an improved door pillar allowing the blind space between the front and rear windows of a four-door automobile to be reduced to a minimum. A further object of this invention is to provide a four-door type automobile with an improved door pillar for pivotally supporting a vehicle rear door and allowing the blind space between the window of this door and the window of the front door to be reduced to a minimum.

These and other objects of this invention will be readily apparent from the following specification and drawings, in which:

Figure 3 is a view on the plane indicated by line 3—3 of Figure 1 showing the rear side of the pillar;

Figure 4 is a view on the plane indicated by line 4—4 of Figure 1 showing the door pillar above the body belt line and the portions of the window frames abutting against the pillar.

Figure 1:
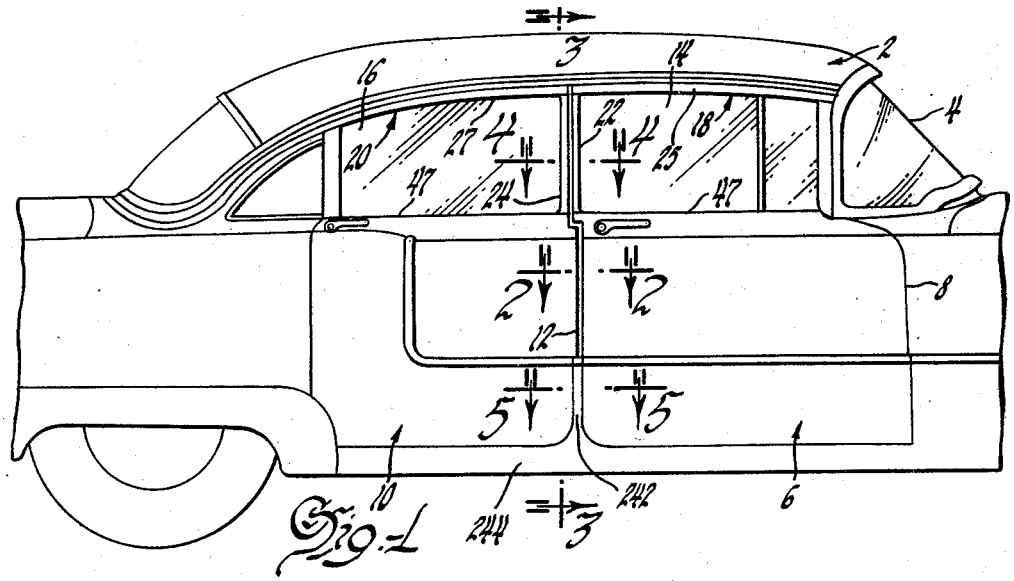
Figure 1 is a partial view of a four-door type automobile embodying the door and door pillar of this invention.

Referring now to Figure 1 of the drawings, an automobile 2 has a windshield 4, a front door 6 hinged at its forward edge 8 to body 2, and a rear door 10 hinged at its forward edge 12 to the door pillar of this invention. The front door 6 is provided with a window 14 which moves vertically into and out of a well provided in the door, and the rear door 10 is provided with a similar window 16 which also moves vertically into and out of a well provided in the door. The front and rear doors are provided with window frames 18 and 20, respectively, which are mounted on the doors. The rear portion 22 of window frame 18 and the forward portion 24 of window frame 20 are each formed of die-cast channels. These channels are secured to the doors within the door wells and are also joined to the upper portions 25 and 27 of the window frames.

Referring now to Figures 1 and 4 of the drawings, the die-cast sections 22 and 24 are provided with channels 26 and 28, respectively, and Bailey channels 29 and 31 are mounted within these channels. The surfaces 30 and 32 of the die-cast sections 22 and 24, respectively, are oblique to the bases of channels 26 and 28, respectively. Grooves 33 and 35 are formed in the bases of the channels and the bases of these grooves are parallel to surfaces 30 and 32. Weather strip elements 34 and 36 which fit against surfaces 30 and 32 are secured to the die-cast sections by a number of expansive spring clips 38 and 40 which extend through openings 41 and 42 of the die-cast sections into grooves 33 and 35, respectively. The Bailey channels 29 and 31 are partially cut out at 43 and 44 to provide room for the spring clips. By making the surfaces 30 and 32 of the die-cast sections angular with respect to the bases of channels 26 and 28, interference is avoided between the spring clips and the front and rear windows 14 and 16, as the spring clips will extend to one side of the windows. The die-cast sections 22 and 24 have marginal flanges 45 and 46 which conceal weather strips 34 and 36 and overlap the door pillar in the closed position of the door. Surfaces 30 and 32, grooves 33 and 35, and marginal flanges 45 and 46 extend only from the roof of the automobile to the body belt line 47, Figure 1.

Figure 4 also shows a cross section of the upper portion of the pillar above the body belt line 47. The upper portion of the pillar is formed of channels 48 and 50 having laterally extending flanges 52 and 54, respectively, which are welded together. These channels extend from the body belt line 47 to the roof of the vehicle and a reinforcing member 56 is mounted between the channels. A trim channel 58 having laterally extending flanges 60 covers the inboard channel 48, and trim spring channels 62 fit over flanges 52 and 54 and flanges 60 and secure channel 58 to the pillar. Referring now to Figure 3 of the drawings, the upper portion of the pillar will extend from 64, which is the point on the door pillar corresponding to the body belt line 47, to the upper roof rail 66 of the vehicle body, a flange 68 on the pillar being welded to the roof rail.

Figure 2:
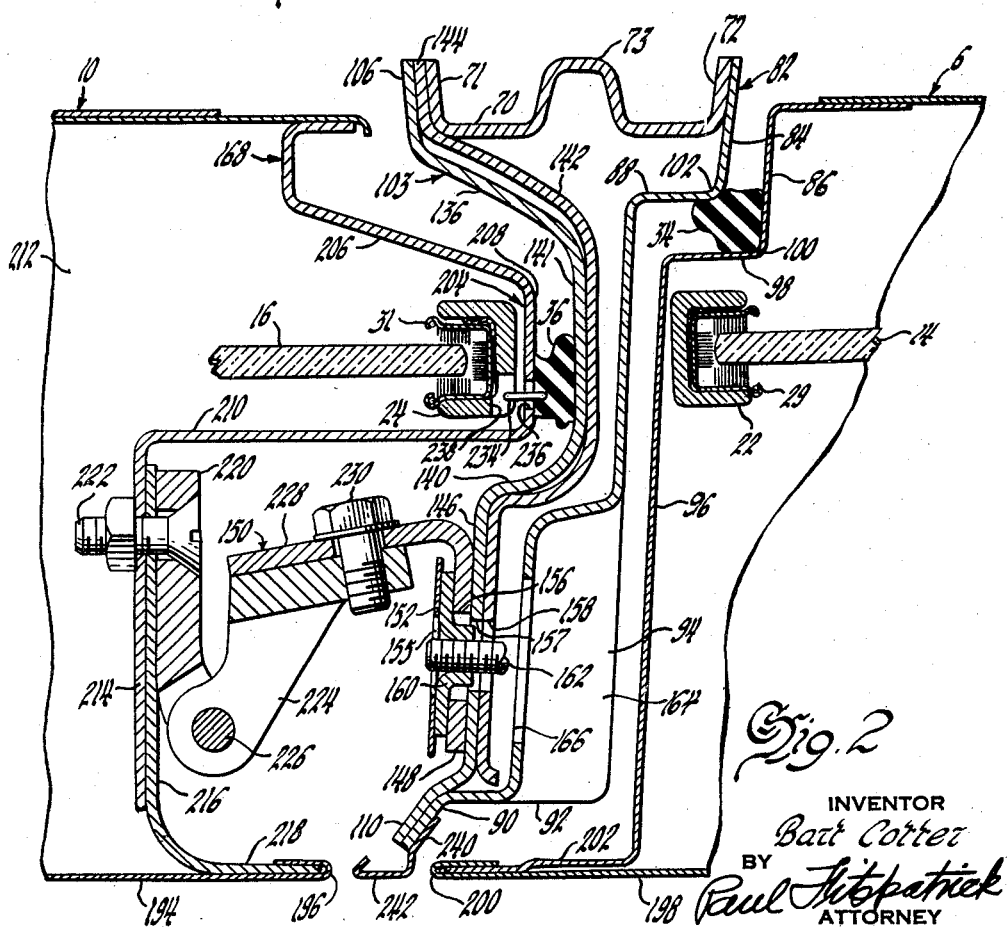
Figure 2 is a view on the plane indicated by line 2—2 of Figure 1 showing the upper rear hinge mounting and the relationship between the rear door and the pillar below the body belt line in the closed position of the door.
Figure 5:
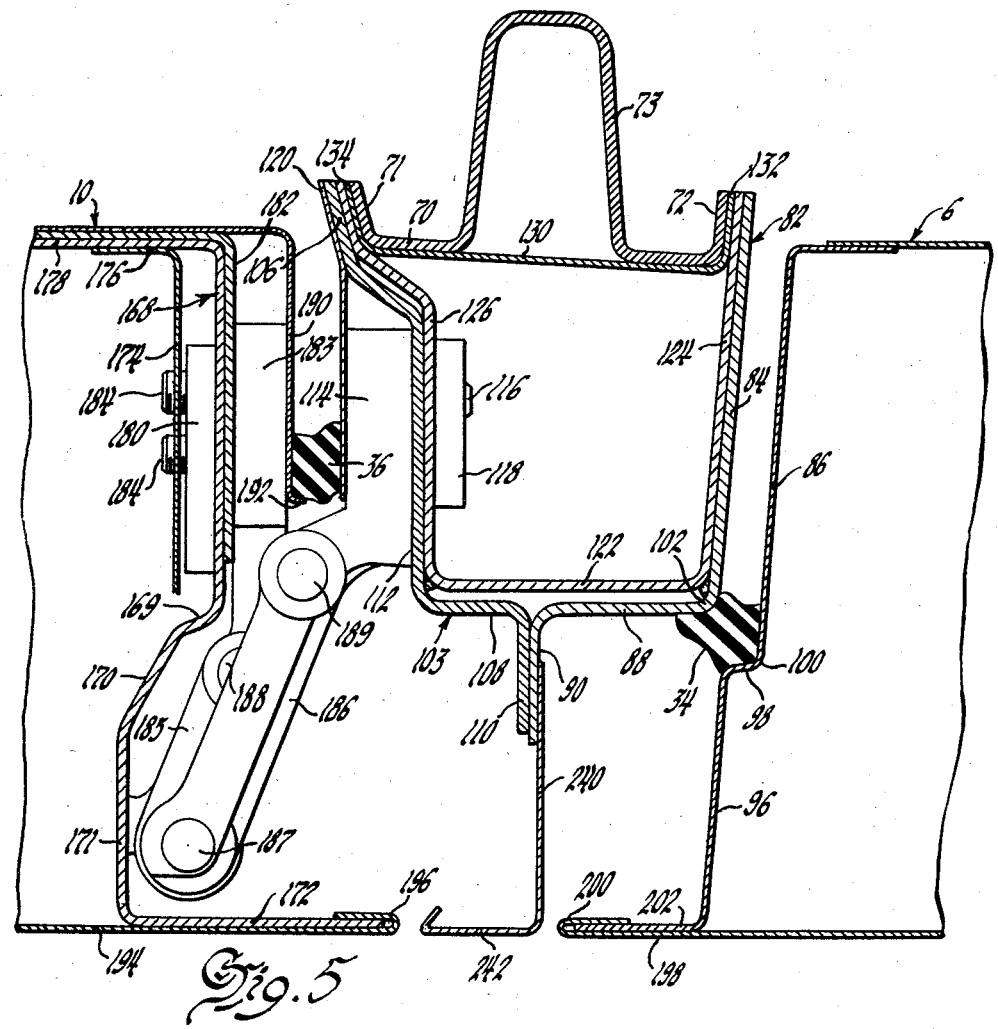
Figure 5 is a view on the plane indicated by line 5—5 of Figure 1 showing the lower hinge mounting and a cross section of the lower rectangular portion of the pillar.

Figures 2, 3, and 5 of the drawings show the portion of the pillar below the belt line. The inboard side of the pillar is a metal plate 70 having flanges 71 and 72 and a channel portion 73 projecting inboard of the body. The lower end of plate 70 is formed to a flange 74 which is welded to a frame member 76 of the door sill, and the upper end of plate 70 is welded to channel 48. Channel portion 73 continuously increases in size from flange 74 to point 78, Figure 3, and then continuously decreases in size from point 78 to point 80 where the channel terminates. The channel portion thus continuously varies in cross section and provides a strengthening rib for plate 70.

The forward side of the pillar is a metal plate 82 having surface 84 facing surface 86 of front door 6, surface 88 at substantially right angles to surface 84 and flange 90 projecting outward of the pillar. A comparison of Figures 2 and 5 will show that surfaces 84 and 88 are gradually narrowed as surface 88 shifts inboard of the body along a gradually tapering line from the lower portion of the pillar to the body belt line. Flange 90 is gradually shifted outward of the body and a portion of flange 90 and surface 88 is formed into surfaces 92 and 94 normal to each other. Surface 86 of front door 6 is offset at 96 and 98 and weather strip 34 is secured to shoulder 100 formed by these surfaces and bears against shoulder 102 at the intersection of surfaces 84 and 88. Weather strip 34 extends along surface 30 to the body belt line and then along shoulder 100 to the bottom surface of front door 6.

The rear side of the pillar facing door 10 is a metal plate 103 having a surface 104, a flange 106 in substantially the same plane as surface 104, a surface 108 extending angularly from surface 104, and a surface 110 which extends from surface 108 at substantially right angles and is welded to flange 90 of metal plate 82. Surface 104 is offset forwardly at 112, Figures 3 and 5, and one leaf 114 of the lower hinge fits in this offset and is secured to the pillar by bolts 116 and a threaded plate 118. A plate 120 fixed to flange 106 covers hinge leaf 114. A channel 122 within the pillar has legs 124 and 126 welded to metal plate 82 and flange 106 of plate 103. Channel 122 extends from the lower portion of the pillar to approximately point 128 (Figure 3). A channel 130 also fits within the pillar and has legs 132 and 134 secured to flanges 71 and 72 of plate 70 and legs 124 and 126 of channel 122. Channel 130 also extends to the point indicated by 128.

Plate 103 is offset inwardly of the pillar, Figure 3, and this offset is defined by surface 136 extending angularly from flange 106, shelf 138 extending angularly from offset 112, surface 140 extending at substantially right angles from surface 110, and surface 141 defining the base of the offset. A reinforcing plate 142, Figure 2, extends from point 128 in Figure 3 to the body belt line and generally follows the contour of plate 103. A flange 144 of plate 142 is welded to flange 106 and flange 71. Surface 110 is slightly offset inwardly of the pillar at 146 and leg 148 of angular hinge mounting bracket 150 is secured to the base of this offset.

A cage 152 secured to leg 148 at 154 has spaced openings 155. Leg 148 has similar openings 156, and offset 146 and reinforcing plate 142 have openings 157 and 158, respectively, in alignment with openings 156. A threaded plate 160 fits between cage 152 and leg 148, and bolts 162 are threaded in this plate. Surfaces 92 and 94 of plate 82 are offset inwardly of the pillar at 164, and a lock striker (not shown) for front door 6 is positioned within the offset flush with surfaces 92 and 94. An opening 166 is formed in the base of the offset, and bolts 162 extend through this opening and adjustably secure the lock striker to the pillar within the offset.

Referring now to Figure 5, the lower part of rear door 10 has surface 168 facing the pillar, which surface is offset at 169, 170, and 171 terminating in a marginal flange 172. A cage 174 has flange 176 secured to surface 178, and a threaded plate 180 fits between the cage and surface 168. Door 10 also has a reinforcing plate 182 secured to surfaces 168 and 178, and lower hinge leaf 183 is secured to the door by bolts 184 which are threaded in plate 180 and extend through suitable openings (not shown) in cage 174. Hinge leaves 114 and 183 are interconnected by links 185 and 186 which are pivotally connected at 187, link 185 being pivotally connected to hinge leaf 183 at 188 and link 186 being pivotally connected to hinge leaf 114 and 189. A plate 190 is secured to reinforcing plate 182 of door 10 and partially covers hinge leaf 183. The lower portion of weather strip 36 is mounted on the flanged outer edge 192 of plate 190 and bears against plate 120 in the closed position of the doors. The outer door panel of rear door 10 is formed by a metal sheet 194 having a flanged edge 196 fitting over the marginal flange 172 of surface 168. The outer door panel of the front door 6 is a similar plate 198 having a flanged edge 200 fitting over a marginal flange 202 of the offset portion 96 of plate 86.

Referring now to Figure 2 of the drawings, surface 168 has a projection 204 which fits within the offset of the pillar defined by surfaces 136, 138, 140, and 141. This projection is defined by surface 206 facing surface 136, surface 208 facing the base 141 of the offset and surface 210 facing the surface 140. The projection provides a housing for the rear window 16 and allows the rear window to move vertically into and out of the door well 212 formed in the door. Surface 168 is also formed to a flange portion 214 which faces the offset 146 formed in surface 110. An angular reinforcing plate 216 is secured to flange 214 and the flanged edge 196 of the outer door panel 194 fits over leg 218 of plate 216. One hinge leaf 220 of the upper door hinge is secured to flange 214 of plate 168 and plate 216 by a number of bolts 222. The other hinge leaf 224 is pivotally secured to hinge leaf 220 at 226 and is adjustably secured to leg 228 of bracket 150 by bolts 230.

Weather strip 36 is secured to surface 208 by a number of expansive spring clips 234 extending through openings 236 provided in surface 208. The weather strip bears against the base 141 of the offset in the door pillar. Weather strip 36 extends along surface 32 to the body belt line, then along surface 208 of projection 204, then along the bottom surface of the projection where the weather strip bears against surface 138 of the offset in the pillar, and then along plate 190 to the bottom surface of the rear door 10. It will be noted that the diecast channel 24 is partially cut out at 238 for the spring clips, although below the belt line of the body there is no need to offset the spring clips to one side of the rear window 16 as is done above the belt line. A guard 240, Figure 5, is secured to flange 90 of plate 82 and has a flanged portion 242 fitting between the marginal flanges 172 of door 10 and 202 of door 6. Flange portion 242 is welded to the rocker panel 244, Figure 1, of the vehicle in order to provide a smooth exterior to the vehicle from the rocker panel 244 to approximately the body belt line. The guard follows the outer contour of the vehicle as can be seen in Figure 3. The front door 6 and the rear door 10 swing outwardly of the vehicle, with the flange 218 of the rear door swinging inwardly of the vehicle as viewed in Figures 2 and 5.

Thus, this invention reduces the blind space between the front and rear doors to a minimum and also allows both the front and rear door windows to be moved vertically into and out of the door wells without interfering with the rear door hinges. The forward portion of the rear window overhangs the space between the rear door and the pillar and also the portion of the door pillar below the body belt line. By offsetting the rear sides of the pillar facing the rear door and by forming a projection on the rear door fitting within this offset in the closed position of the door, the rear window is allowed to move vertically into and out of the door well. The support bracket for the upper rear door hinge allows the hinge and the lock striker to be adjustable and also allows the lock striker to be mounted flush with the forward surface of the pillar.

While a specific embodiment of this invention has been shown and described, various changes and modifications may be made within the scope and spirit of the invention without departing from it.

I claim:

1. In a vehicle body of the type having front and rear doors on one side of said body, the combination comprising a substantially upright door pillar rigidly mounted on said body between said front and rear doors, means hingedly mounting one of said doors on said pillar for swinging movement outboard of said body, the inboard portion of the one side of said pillar facing said one door having a channeled portion recessed into the one side of said pillar, the outboard portion of said pillar being spaced longitudinally of the outer edge of said one door to provide clearance for the inward swinging of said edge as said door is opened, said one door facing said one side of said pillar having an extension extending beyond the inner marginal edge thereof and received within said channeled portion of said pillar in the closed position of said one door, said channeled portion having a length sufficient to receive said extension in the closed position of said door, and a window slidably mounted in said one door and having an edge portion thereof received within said extension of said door in the lowered position of said window within said door.

2. In a vehicle body of the type having front and rear doors on one side of said body, the combination comprising a substantially upright door pillar rigidly mounted on said body between said front and rear doors, one of said doors having a marginal flange extending longitudinally of said body, spaced hinge means mounting one of said doors on said pillar for swinging movement outward of said body, the inboard portion of the one side of said pillar facing said one door having a channeled portion recessed into the one side of said pillar, the outboard portion of said pillar being spaced longitudinally of the marginal flange of said one door to provide clearance for the inward swinging of said flange as said door is opened, said one door facing said one side of said pillar having an extension extending beyond the inner marginal edge thereof and received within said channeled portion of said pillar in the closed position of said one door, said channeled portion having a length sufficient to receive said extension in the closed position of said door, said extension being spaced inwardly of said marginal flange with one of said spaced hinge means being located between said extension and said marginal flange of said one door, and a window slidably mounted in said one door and having an edge portion thereof received within said extension of said door in the lowered position of said window within said door.

3. In a vehicle body of the type having front and rear doors on one side of said body, the combination comprising a substantially upright door pillar rigidly mounted on said body between said front and rear doors, one of said doors having a marginal flange extending longitudinally of said body, spaced hinge means mounting one of said doors on said pillar for swinging movement outboard of said body, the inboard portion of the one side of said pillar facing said one door having a channeled portion recessed into the one side of said pillar, the outboard portion of said pillar being spaced longitudinally of the marginal flange of said one door to provide clearance for the inward swinging of said flange as said door is opened, said one door facing said one side of said pillar having an extension extending beyond the inner marginal edge thereof and received within said channeled portion of said pillar in the closed position of said one door, said channeled portion having a length sufficient to receive said extension in the closed position of said door, said extension being spaced inwardly of said marginal flange with one of said spaced hinge means being located between said extension and said marginal flange and the other of said spaced hinge means being located below said channeled portion of said pillar and said extension of said door, and a window slidably mounted in said one door and having an edge portion thereof received within said extension of said door in the lowered position of said window within said door.

4. In a vehicle body of the type having front and dear doors on one side of said body, the combination comprising a substantially upright door pillar rigidly mounted on said body between said front and rear doors, one of said doors having a marginal flange extending longitudinally of said body, spaced hinge means mounting one of said doors on said pillar for swinging movement outboard of said body, the inboard portion of the one side of said pillar facing said one door having a channeled portion recessed into the one side of said pillar, the outboard portion of said pillar being spaced longitudinally of the marginal flange of said one door to provide clearance for the inward swinging of said flange as said door is opened, said one door facing said one side of said pillar having an extension extending beyond the inner marginal edge thereof and received within said channeled portion of said pillar in the closed position of said one door, said channeled portion having a length sufficient to receive said extension in the closed position of said door, and a window slidably mounted in said one door and having an edge portion thereof received within said extension of said door in the lowered position of said window within said door, said extension being spaced inwardly of said marginal flange with one of said spaced hinge means being mounted on said pillar adjacent said channeled portion and being mounted on said door adjacent said extension.

5. In a vehicle body of the type having front and rear doors on one side of said body, the combination comprising a substantially upright door pillar rigidly mounted on said body between said front and rear doors, means hingedly mounting one of said doors on said pillar for swinging movement outboard of said body, the inboard portion of the one side of said pillar facing said one door having a channeled portion recessed into the one side of said pillar, the outboard portion of said pillar being spaced longitudinally of the outer edge of said one door to provide clearance for the inward swinging of said edge as said door is opened, said one door facing said one side of said pillar having an extension extending beyond the inner marginal edge thereof received within said channeled portion of said pillar in the closed position of said one door, said channeled portion having a length sufficient to receive said extension in the closed position of said door, a window slidably mounted in said one door and having an edge portion thereof received within said extension of said door in the lowered position of said window within said door, and the other side of said pillar facing said other door being offset inwardly of said pillar to receive a lock striker adapted to be mounted therein.

References Cited in the file of this patent

UNITED STATES PATENTS

| | | |
|---|---|---|
| 1,831,455 | Kubler | Nov. 10, 1931 |
| 2,167,664 | Matthews | Aug. 1, 1939 |
| 2,532,203 | Stephenson et al. | Nov. 28, 1950 |
| 2,680,645 | Brill | June 8, 1954 |